(12) United States Patent  
Wang et al.

(10) Patent No.: US 8,250,471 B2  
(45) Date of Patent: Aug. 21, 2012

(54) ELECTRONIC DEVICES AND METHOD FOR CONTROLLING THE USER INTERFACE THEREOF

(75) Inventors: Chung-Hsiang Wang, Taipei Hsien (TW); Yu-Sheng Hou, Taipei Hsien (TW); Jian-Cheng Lin, Taipei Hsien (TW); El-Hinn Elizabeth, Taipei Hsien (TW); Pei-Hsi Cheng, Taipei Hsien (TW); Zhi-Fang Chen, Shenzhen (CN); Bor-Chuan Lin, Taipei Hsien (TW); Jiing-Renn Yu, Taipei Hsien (TW); Tzu-Cheng Yu, Santa Clara, CA (US)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 201 days.

(21) Appl. No.: 12/616,207

(22) Filed: Nov. 11, 2009

(65) Prior Publication Data

US 2010/0287469 A1    Nov. 11, 2010

(30) Foreign Application Priority Data

May 7, 2009    (CN) .......................... 2009 1 0302154

(51) Int. Cl.  
*G06F 3/01* (2006.01)  
*G06F 3/048* (2006.01)

(52) U.S. Cl. ........................................ 715/702; 715/764  
(58) Field of Classification Search .................. 715/702, 715/764  
See application file for complete search history.

(56) References Cited

U.S. PATENT DOCUMENTS

| | | | |
|---|---|---|---|
| 2003/0013483 A1* | 1/2003 | Ausems et al. | 455/556 |
| 2005/0114788 A1* | 5/2005 | Fabritius | 715/767 |
| 2006/0161889 A1* | 7/2006 | Stabb et al. | 717/113 |
| 2010/0169778 A1* | 7/2010 | Mundy et al. | 715/716 |

FOREIGN PATENT DOCUMENTS

| | | |
|---|---|---|
| CN | 1871578 A | 11/2006 |
| CN | 101184298 A | 5/2008 |

* cited by examiner

*Primary Examiner* — William Bashore  
*Assistant Examiner* — David Phantana Angkool  
(74) *Attorney, Agent, or Firm* — Altis Law Group, Inc.

(57) ABSTRACT

An electronic device and a method for controlling an user interface thereof are provided. The method includes detecting an orientation of the electronic device, determining a arrangement of the user interface according to the detected orientation, displaying a shortcut key area and a status area on the user interface, and adjusting the user interface according to the operational signals from a touch panel of the electronic device.

14 Claims, 11 Drawing Sheets

ELECTRONIC DEVICES AND METHOD FOR CONTROLLING THE USER INTERFACE THEREOF

BACKGROUND

1. Technical Field

Embodiments of the present disclosure relate to user interface, and more particularly to electronic devices and a method for controlling the user interface thereof.

2. Description of Related Art

Currently, mobile phones are becoming more and more important for users. In addition to providing basic functions (e.g., making and receiving calls), mobile phones also provide functions, such as displaying multimedia files, navigating services, and shooting pictures or videos.

However, because so many functions may often crowd a user interface of an electronic device, users may have to perform multiple operations so as to activate a specific function resulting in bad performance.

Accordingly, a electronic device and a method for controlling the user interface thereof are called for in order to overcome the limitations described.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
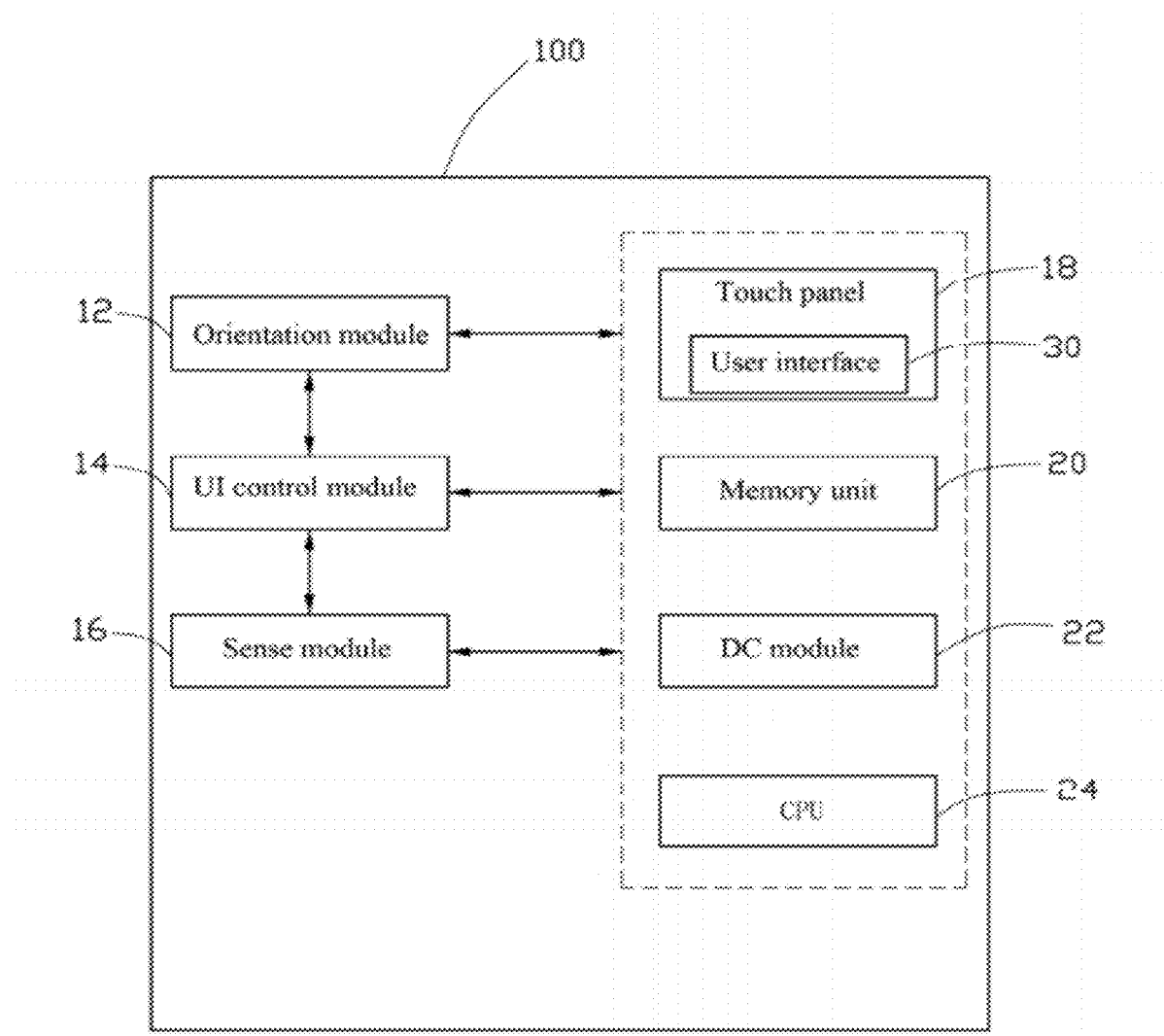
FIG. 1 is a block diagram of an embodiment of an electronic device.

FIG. 1 is a block diagram of an embodiment of an electronic device 100. The electronic device 100 includes an orientation module 12, a user interface (UI) control module 14, a touch panel 18, a memory unit 20, a digital camera (DC) module 22 and a processor 24. The touch panel 18 allows for display of a user interface 30 of the electronic device 100 and for receiving operations applied to the user interface 30 so as to transmit operational signals to the processor 24 and to the UI control module 14.

Figure 2:
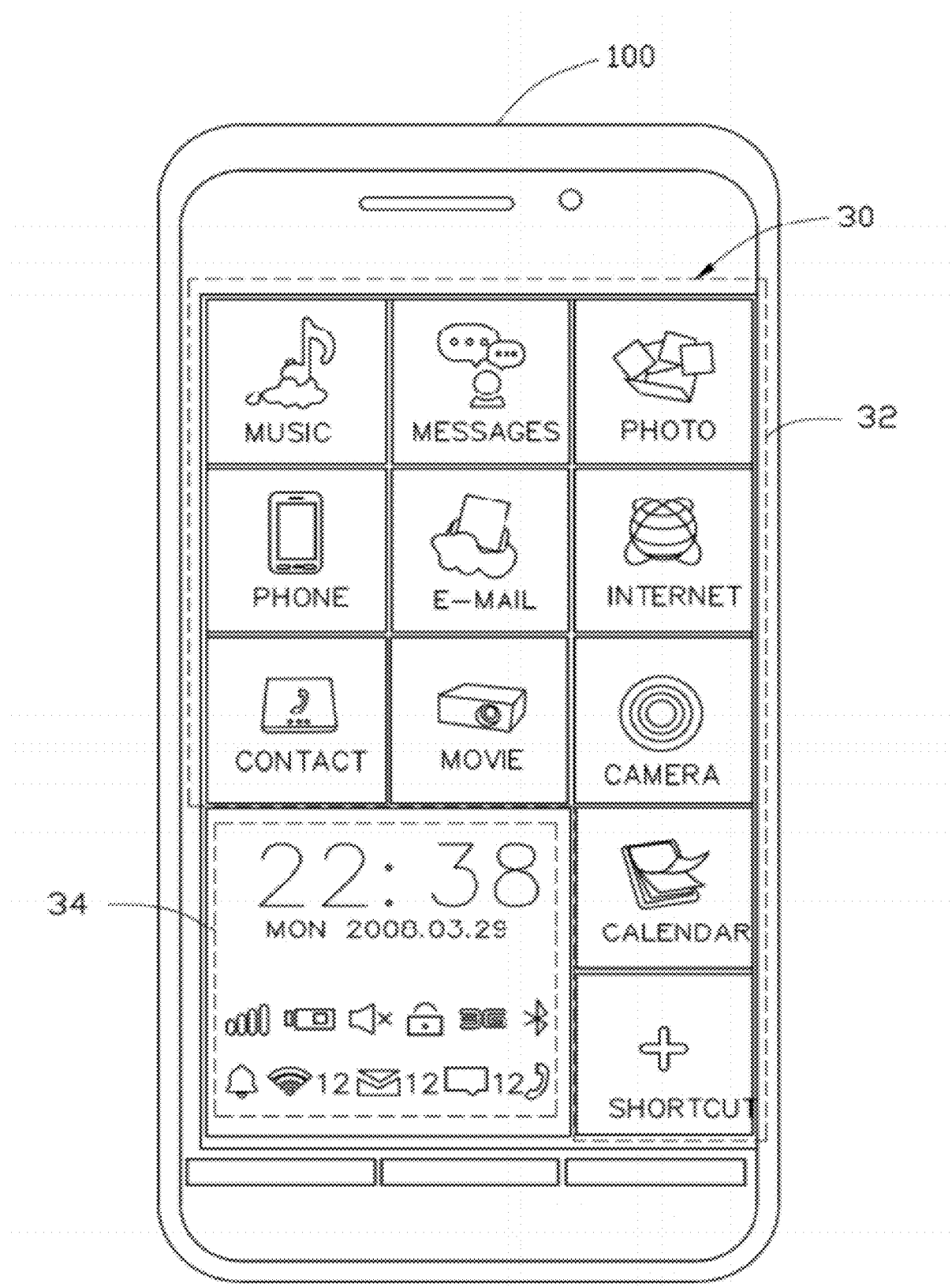
FIGS. 2 and 3 show one example of the user interface of the electronic device shown by a vertical arrangement and a horizontal arrangement.

The electronic device 100 may be oriented in a plurality of directions. In one embodiment, the electronic device 100 is oriented in a first vertical direction, as shown in FIG. 2. In addition, the electronic device 100 may be oriented in a first horizontal direction, as shown in FIG. 3.

The orientation module 12 is configured for detecting an orientation of the electronic device 100, and for transmitting an orientation signal indicative of the detected orientation to the UI control module 14.

Upon receiving the orientation signal, the UI control module 14 controls the user interface 30 according to the orientation indicated by the orientation signal.

Figure 3:
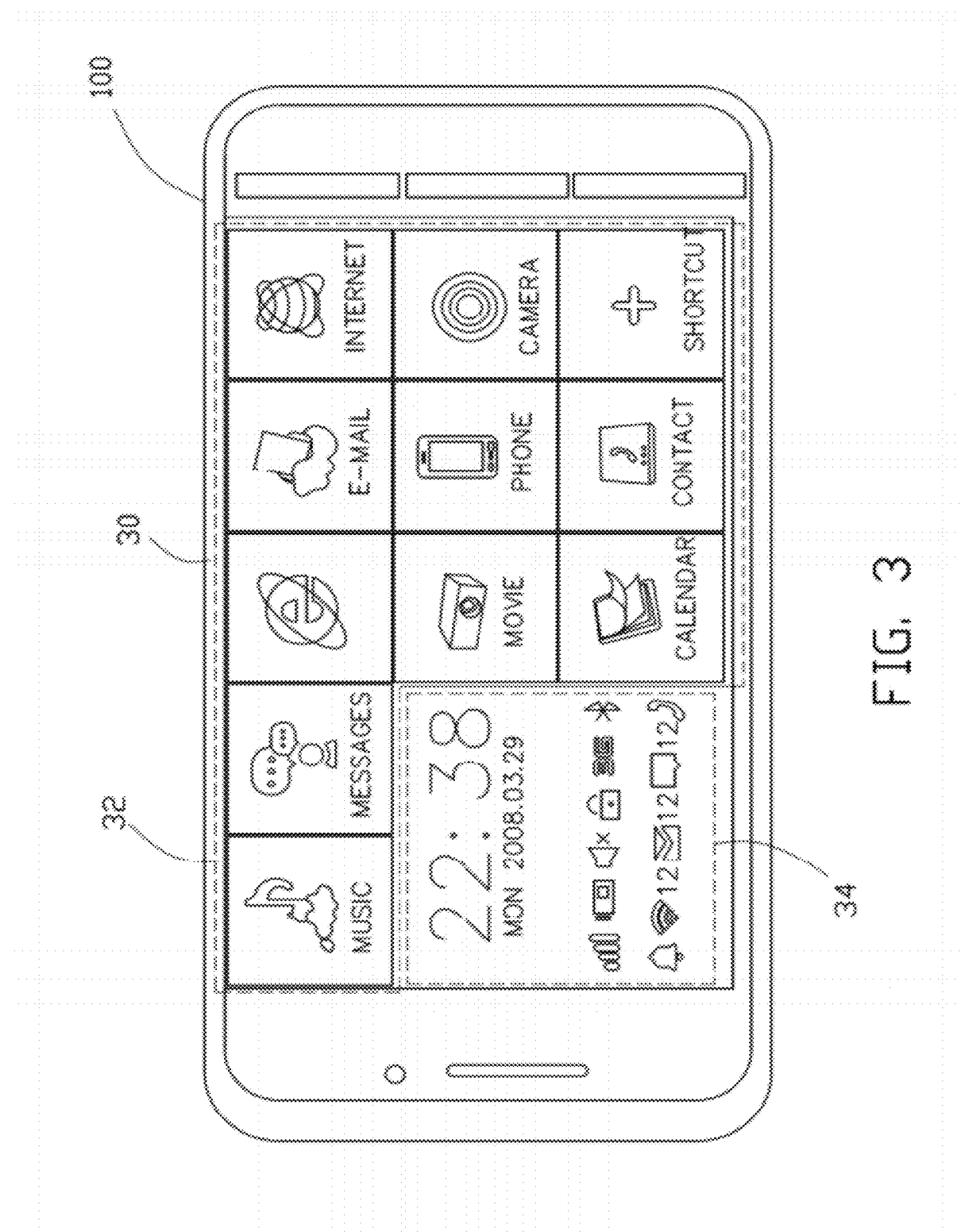

As shown in FIGS. 2 and 3, the user interface 30 of the electronic device 100 may be shown in a vertical arrangement or a horizontal arrangement. The UI control module 14 controls the user interface 30 to be shown in the vertical arrangement, as shown in FIG. 2, when the orientation signal indicates that the electronic device 100 is oriented in the first vertical direction. The UI control module 14 controls the user interface 30 to be shown in the horizontal arrangement, as shown in FIG. 3, when the orientation signal indicates that the electronic device 100 is oriented in the first horizontal direction.

The user interface 30 includes a shortcut key area 32 and a status area 34. As shown in FIGS. 2 and 3, in one embodiment, the status area 34 is arranged in the lower left corner of the user interface 30. In other embodiments, the status area 34 may be arranged in the upper left corner, upper right corner, lower right corner, or other positions.

The shortcut key area 32 includes a plurality of shortcut keys for activating applications, such as applications for displaying music, short massages, pictures, videos, for example.

The status area 34 is configured for displaying status information, such as date, time, and battery status, of the electronic device 100.

The UI control module 14 is configured for receiving the operational signals from the touch panel 18 so as to activate corresponding applications or to customizedly adjust the shortcut key area 32.

In one embodiment, the customized adjustment including a shortcut key rearrangement. Upon receiving the operational signal indicating that one specific shortcut key is dragged to another position in the shortcut key area 32, the UI controlling module 14 adjusts the position of the specific shortcut key. For example, the shortcut key "MUSIC" shown in the upper left corner of the shortcut key area 32 may be dragger to the position original arranged with the shortcut key "MOVIE."

Figure 4:
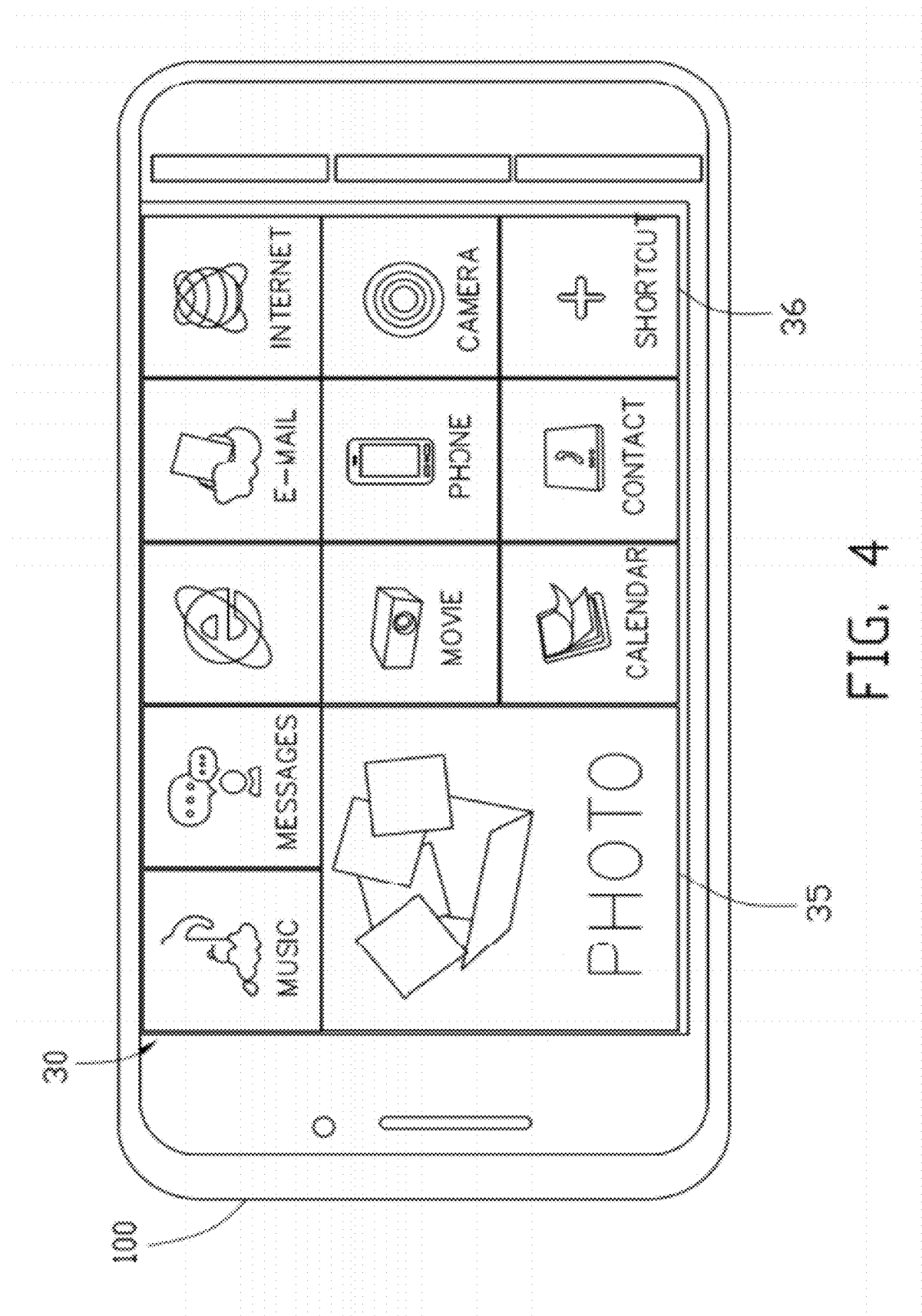
FIG. 4 shows one example of the user interface including a most frequently key.

In other embodiments, as shown in FIG. 4, the user interface 30 only includes the shortcut key area 32. Upon receiving the operational signal indicating that one specific shortcut key is dragged to the position of the status area 34, the UI controlling module 14 designates the specific shortcut key as the most frequent key 35. In this embodiment, the dimension of the most frequently key 35 is nine times larger, but not limited to, than dimensions of other shortcut keys.

In one embodiment, the shortcut key area 32 includes at least one "Add-Key" 36. When detecting the "Add-Key" 36 is touched, the UI controlling module 14 pops up a menu on the touch panel 18 including a plurality of applications installed in the electronic device 100 and contact items saved in the address book in the electronic device 100 for the users to select. After receiving the operational signals indicating that the "Add-Key" is touched and one of the application or one contact item is selected, the UI controlling module 14 sets the selected application or the selected contact item as one shortcut key on the user interface 30.

Figure 5:
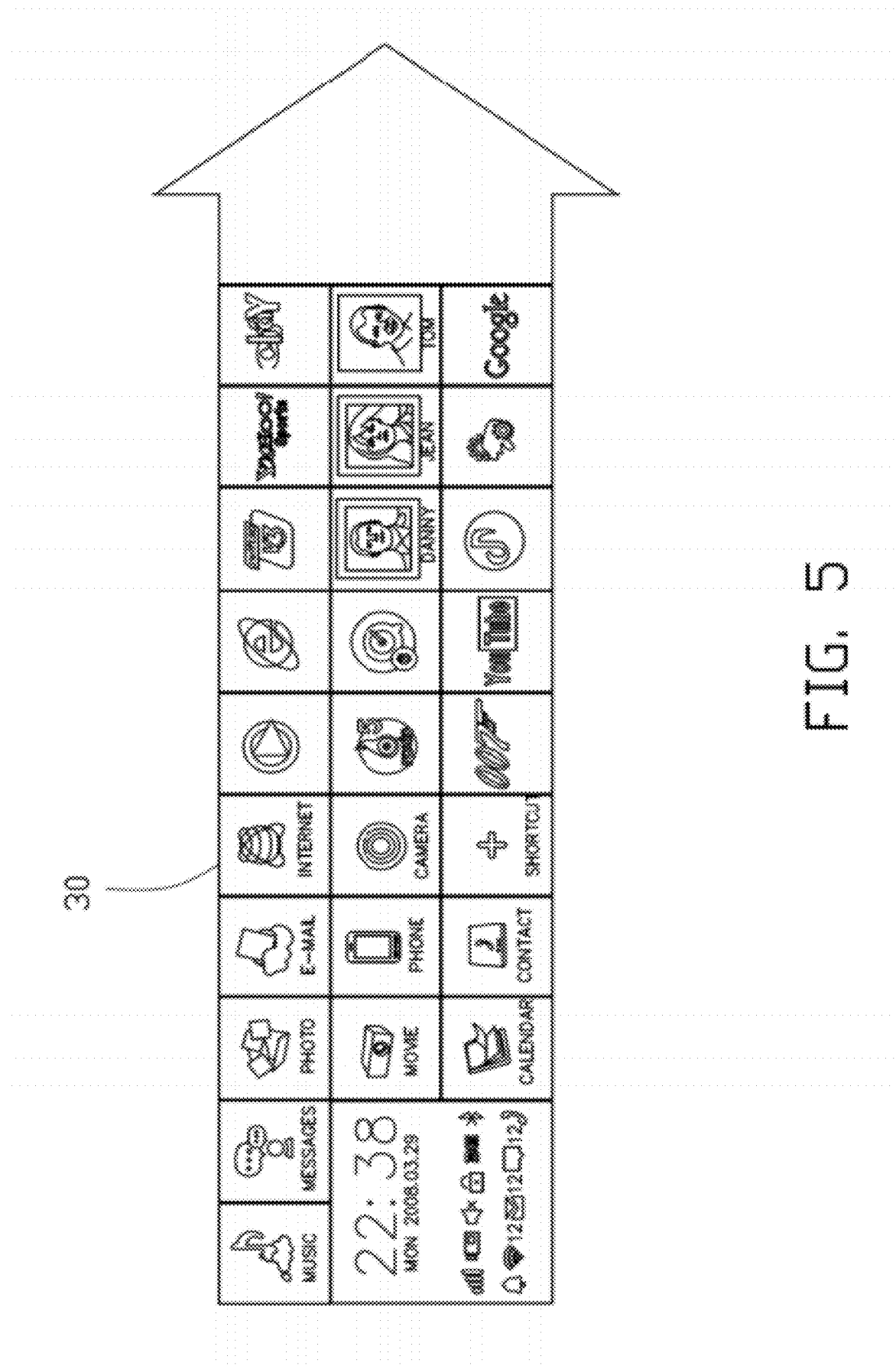
FIG. 5 shows one example of the user interface including the extended key area.

In one embodiment, the shortcut key area 32 is not limited to the dimension for which the touch panel 18 may display. The customized adjustment includes an extended shortcut key area 32. FIG. 5 shows an example of the user interface 32 having the extended shortcut key area. After receiving the operational signal indicative of a horizontal slide on the touch panel 18 (e.g., movement of a finger or a stylus), the UI control module 14 horizontally adjusts the shortcut key area so as to display the shortcut keys originally arranged in the right or left extended shortcut key area 32. In other embodiments, the extended shortcut key area may be extended upward or downward when the operational signal indicative of a vertical slide.

Figure 6:
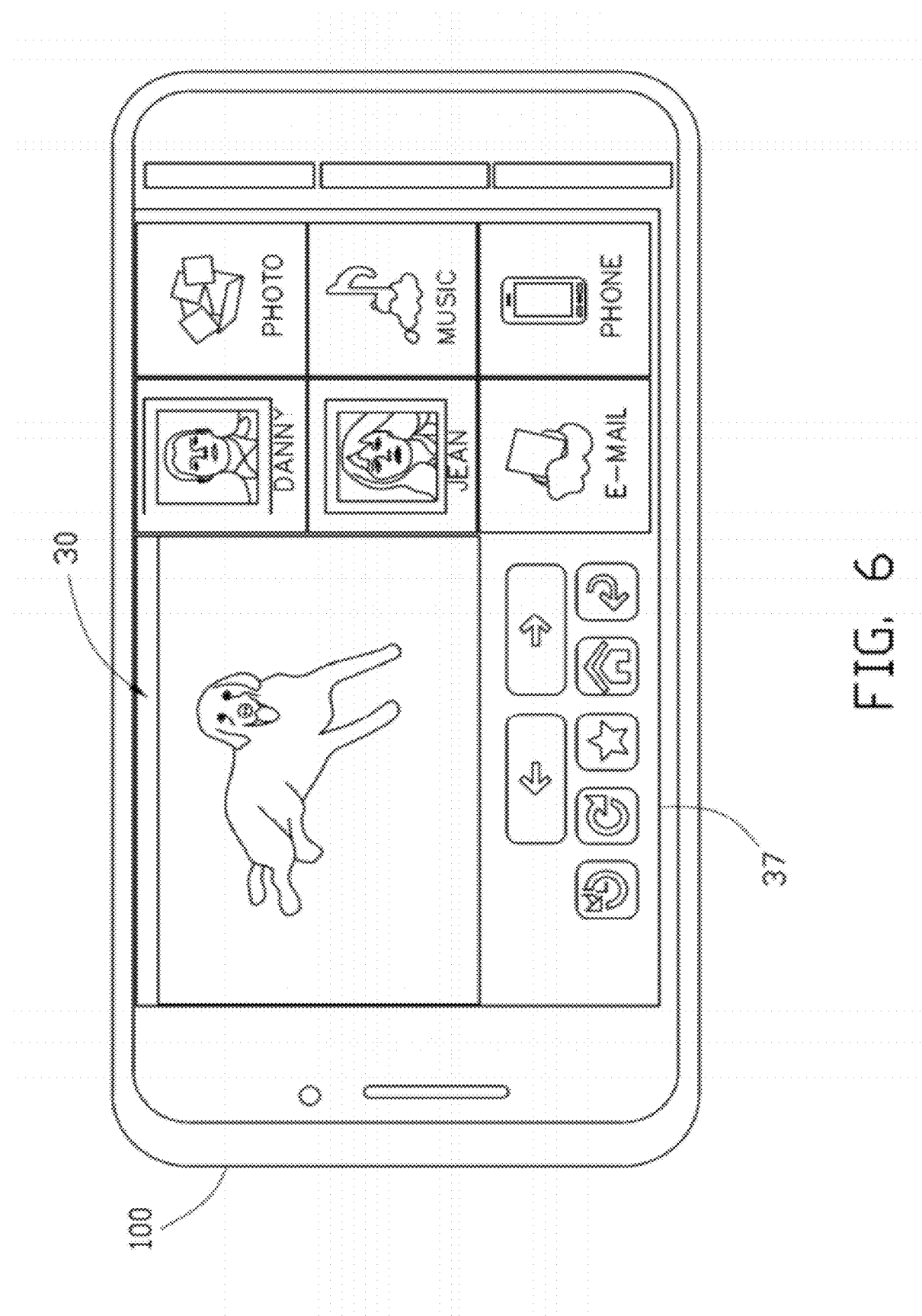
FIG. 6 shows one example of the user interface showing the shortcut key area and a window of an executed application at the same time.

In one embodiment, the UI control module 14 is configured for adjusting the window size of the executed applications. After receiving the operational signal indicating that the window size of the executed application is adjusted to be smaller than a dimension of the touch panel 18, the UI controlling module 14 displays the shortcut key area in a remaining space of the dimension of the touch panel 18. In this way, the shortcut key area 32 may be displayed at the same time. As shown in FIG. 6, in addition to displaying an Internet browser application window 37, the user interface 30 also displays the shortcut key area 32 having a plurality of shortcut keys at the same time. The internet browser application window 37 may display text, images, hypertext markup language, for example.

Figure 7:
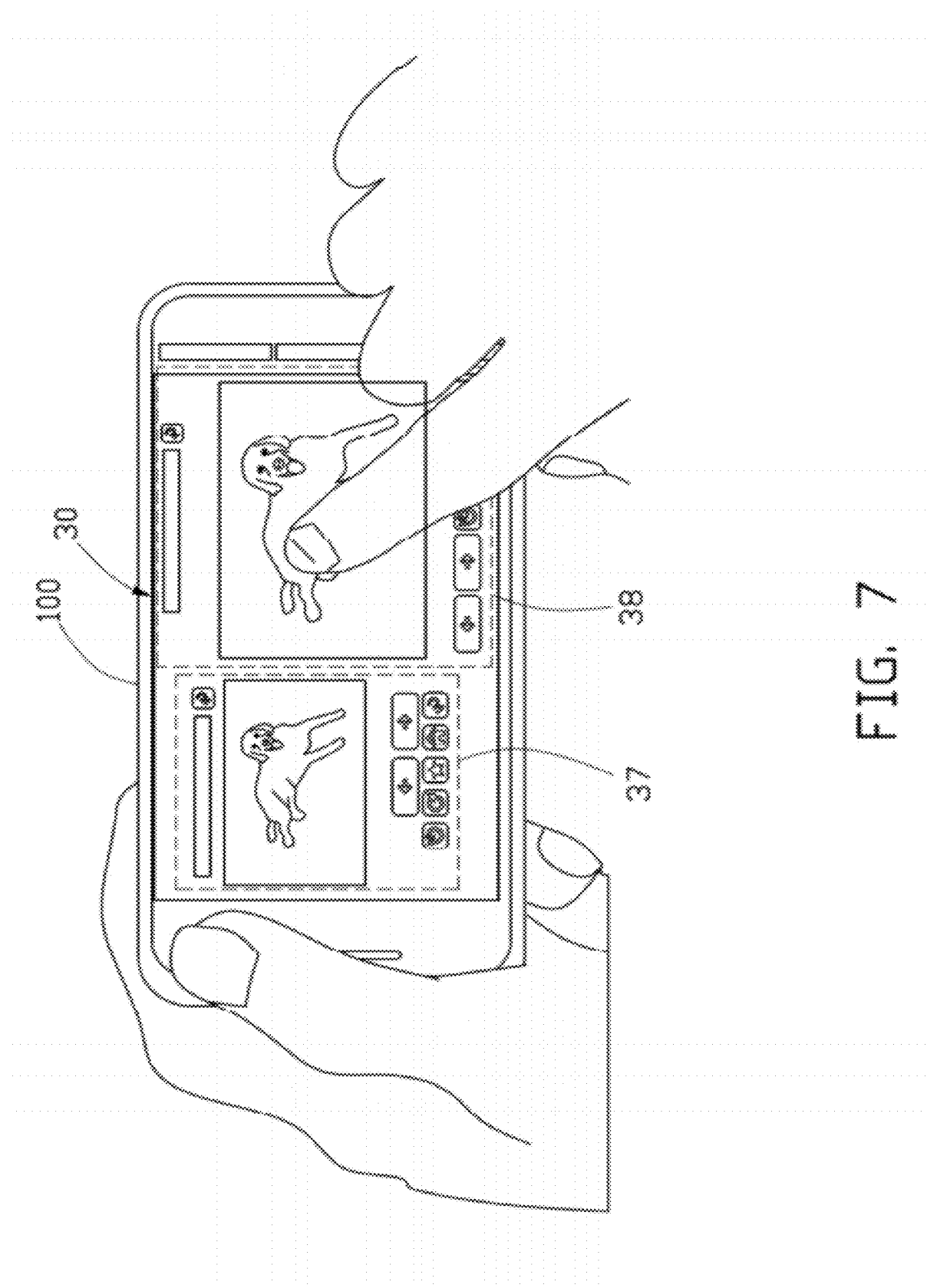
FIG. 7 shows one example of the user interface showing windows of two executed applications at the same time.

In one embodiment, the UI control module 14 is capable of displaying windows of two executed applications at the same time. After receiving the operational signal indicating that the window size of the executed application is adjusted to be smaller than a dimension of the touch panel 18, the UI controlling module 14 displays another window of one selected application in a remaining space of the dimension of the touch panel 18. As shown in FIG. 7, the user interface 30 displays two Internet browser application windows 37, 38 at the same time.

In one embodiment, the electronic device 100 further includes a sense module 16 positioned in at least one end surface of the electronic device 100. The sense module 16 transmits a switch signal to the UI control module 14 upon detecting a pressure applied to the edge surface is larger than a determined threshold. After receiving the switch signal, the UI control module 14 quickly switches the user interface 30 to another executed application.

Figure 8:
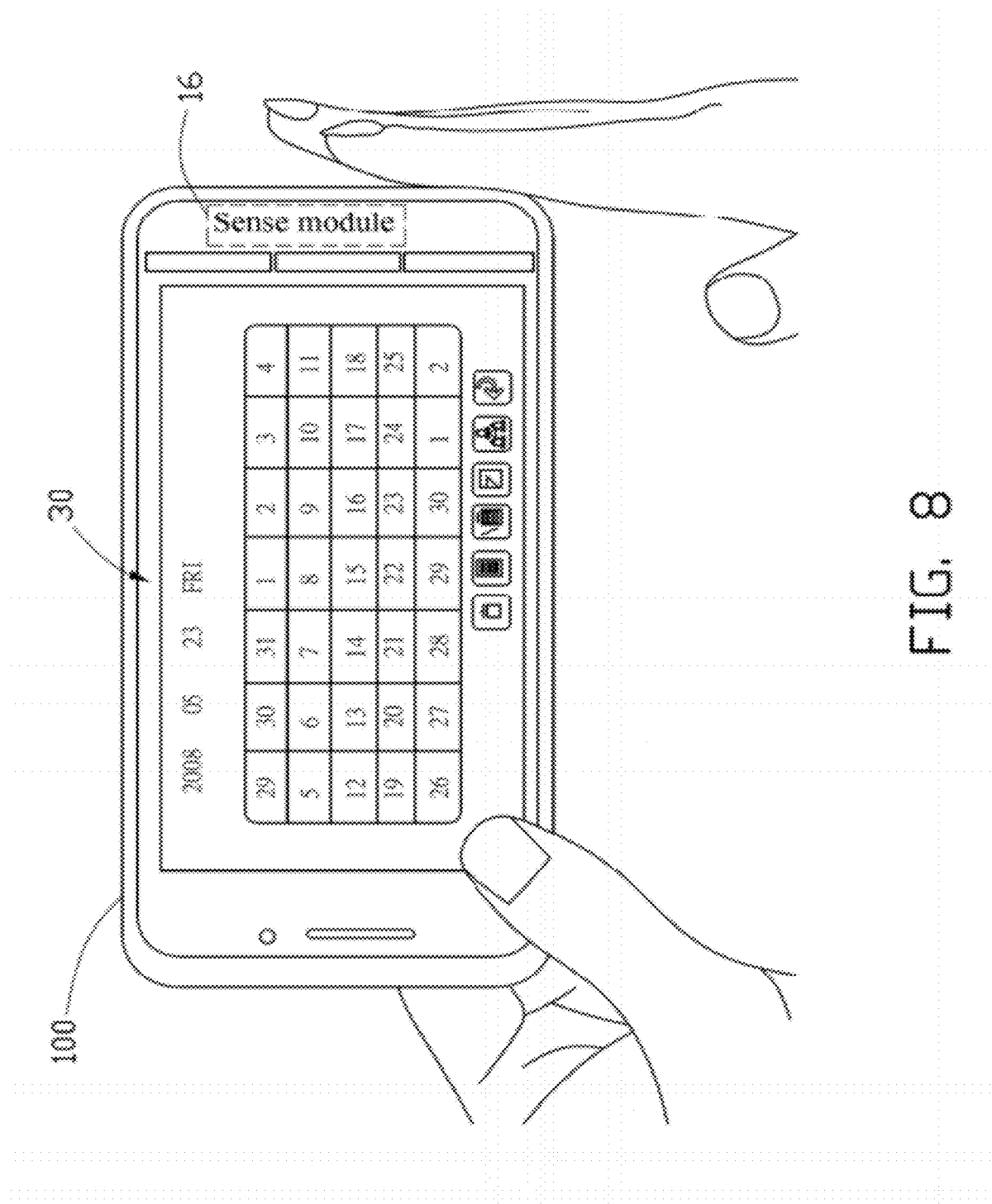
FIG. 8 shows one example of quickly switching the user interface to another executed application.

As shown in FIG. 8, the sense module 16 is positioned near a down edge surface of the electronic device 100. When the electronic device 100 is oriented in the first horizontal direction, the sense module 16 is positioned in a right end of the user interface 30. For example, if the user applies the pressure to the right end of the electronic device 100 and the pressure is larger than the threshold, the sense module 16 transmits the switch signal to the UI control module 14 so as to quickly switch the user interface 30 to another executed application.

Figure 9:
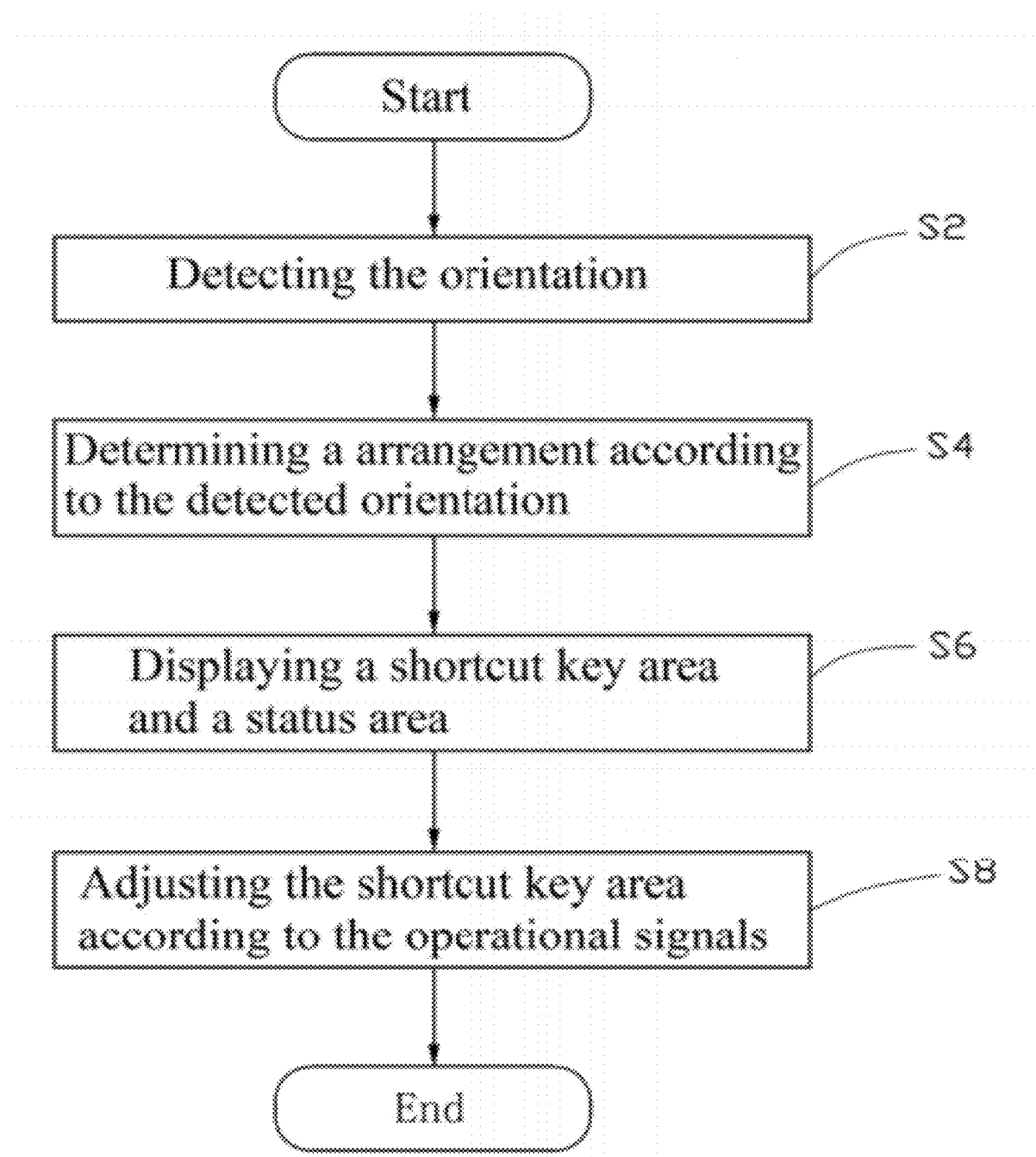
FIG. 9 is a flowchart of an embodiment of a method for controlling the user interface of the electronic device.

FIG. 9 is a flowchart of an embodiment of a method for controlling the user interface of an electronic device. The method of FIG. 9 may used for providing different user interfaces for the electronic device. Depending on the embodiment, additional blocks may be added or deleted and the blocks may be executed in order other than that described.

In block S2, the orientation module 12 detects the orientation of the electronic device 100. In block S4, the UI control module 14 determines an arrangement of the user interface 30 shown on the touch panel 18 according to the detected orientation. The user interface 30 may be shown in a vertical arrangement or a horizontal arrangement.

In block S6, the user interface 30 displays a shortcut key area 32 and a status area 34. The shortcut key area 32 includes a plurality of shortcut keys for activating the applications.

In block S8, the UI control module 14 adjusts the shortcut key area 32 according to the operational signals from the touch panel 18.

Figure 10:
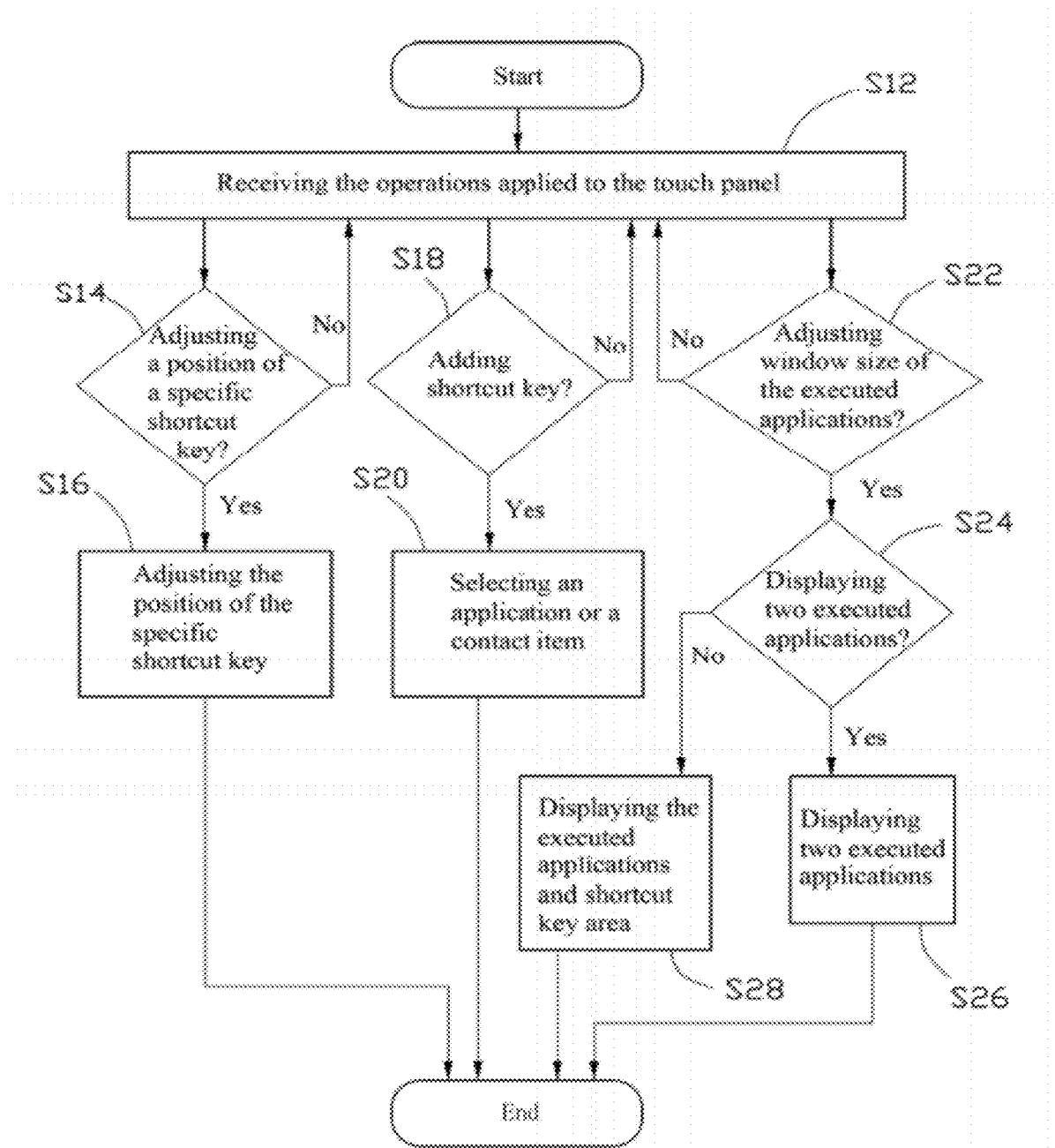
FIG. 10 is a flowchart of an embodiment of a method for customizedly adjusting the user interface of the electronic device.

FIG. 10 is a flowchart of an embodiment of a method for customizedly adjusting the user interface of an electronic device 100. Depending on the embodiment, additional blocks may be added or deleted and the blocks may be executed in order other than that described.

In block S12, the touch panel 18 receives the operations applied thereto. In block S14, the UI control module 14 determines whether the position of a specific shortcut key have to be adjusted.

If the position of the specific shortcut key has to be adjusted, in block S16, the UI control module 14 adjusts the position of the specific shortcut key to another position according to the users input.

If the position of the specific shortcut key has not to be adjusted, the process goes back to block S12.

In block S18, the UI control module 14 determines if the "Add-Key" 36 is touched. If the "Add-Key" 36 is touched, in block S20, the UI control module 14 selects an application installed in the electronic device 100 or a contact item saved in the address book to be the shortcut key.

In the embodiment, in block S20, the contact item saved in the address book of the electronic device 100 may be set to be one shortcut key. In this way, the selected contact item may be displayed on the user interface 30 as one shortcut key.

In block S22, the UI control module 14 determines if the window size of the executed applications has to be adjusted. If the window size of the executed applications has to be adjusted, in block S24, the UI control module 14 further determines if the windows of two executed applications have to be shown at the same time.

If the windows of two executed applications have to be shown at the same time, in block S26, the user interface 30 displays the windows of two executed applications.

If only one window of the executed applications has to be shown, in block S28, the user interface 30 displays the window of the executed applications and the shortcut key area 32 at the same time.

Figure 11:
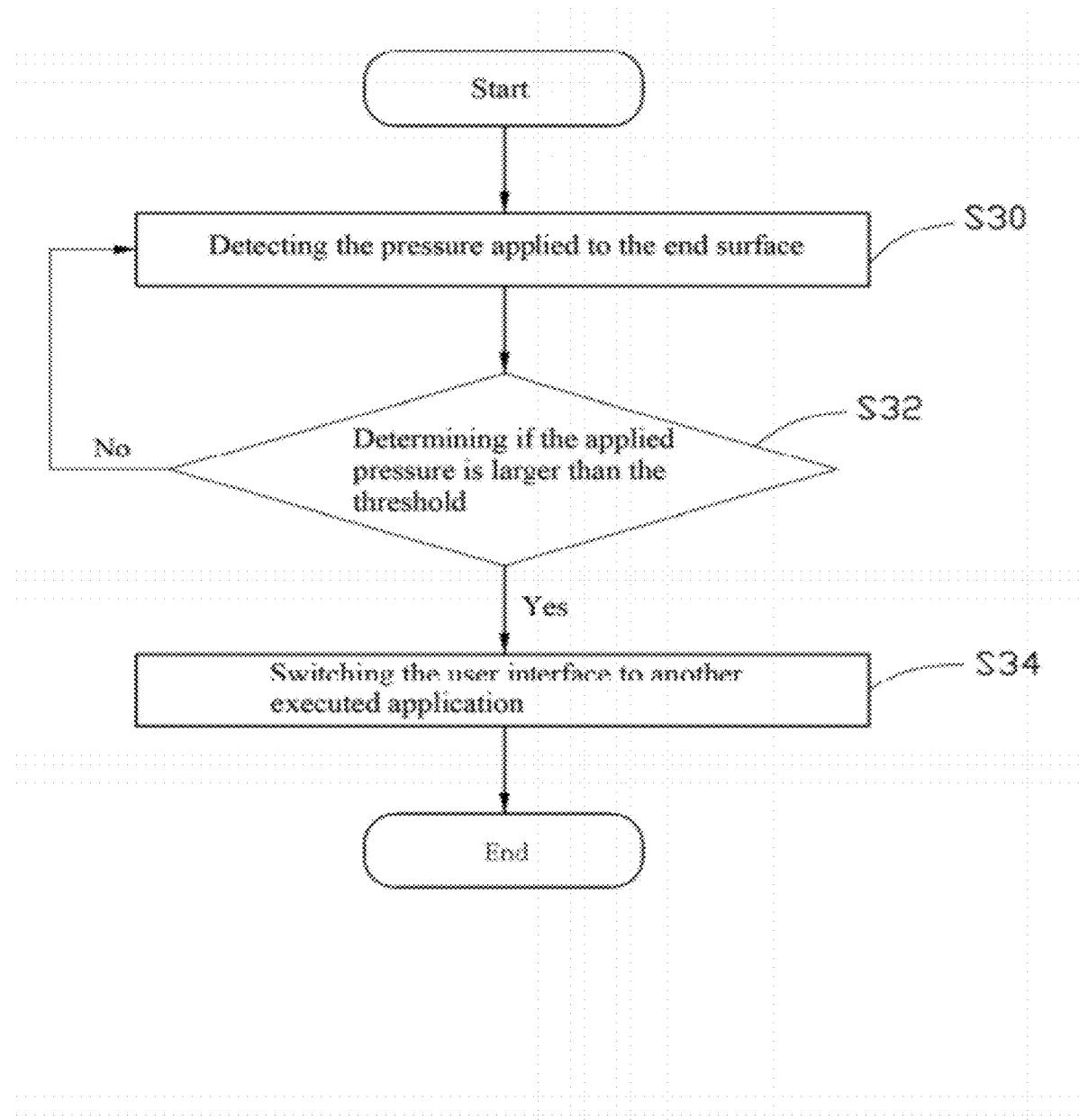
FIG. 11 is a flowchart of an embodiment of a method for quickly switching the user interface to another executed application.

FIG. 11 is a flowchart of an embodiment of a method for quickly switching the windows of the executed applications. The method of FIG. 11 may used for switching the windows of the executed applications according to the detected pressure applied to the electronic device. Depending on the embodiment, additional blocks may be added or deleted and the blocks may be executed in order other than that described.

In block S30, the sense module 16 detects the pressure applied to the end surface installed with the sense module 16 of the electronic device 100. In block S32, the UI control module 14 determines if the applied pressure is larger than the threshold. If the applied pressure is larger than the threshold, in block S34, the UI control module 14 switches the user interface 30 to another executed application.

If the applied pressure is smaller than the threshold, the process goes to block S30 to repeat the above-mentioned processing.

It is important to note that while the disclosure has been described in the context of a fully functioning data processing system, those of ordinary skill in the art will appreciate that the processes of the disclosure are capable of being distributed in the form of a computer readable medium of instructions and a variety of forms and that the disclosure applies equally regardless of the particular type of signal bearing media actually used to carry out the distribution. Examples of computer readable media include recordable-type media such as floppy disc, a hard disk drive, random access memory (RAM), and compact disc-read only memory (CD-ROM), as well as transmission-type media, such as digital and analog communications links.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. An electronic device, comprising:
a touch panel for displaying a user interface and transmitting an operational signal to a processor of the electronic device upon receiving a user input from the user interface;
an orientation module to detect an orientation of the electronic device;
a user interface (UI) control module to control an arrangement of the user interface, the user interface comprising a vertical arrangement and a horizontal arrangement, wherein the arrangement is determined by the orientation detected by the orientation module;
wherein the user interface further comprises a shortcut key area and a status area, the shortcut key area comprising a plurality of shortcut keys for activating applications of the electronic device, and customized adjustments of the shortcut key area is performed in accordance with the operational signal from the touch panel, and the status area is configured for displaying status information of the electronic device;
wherein the UI control module further designates a specific shortcut key as a most frequently used key if the specific shortcut key is dragged to the status area, dimensions of the most frequently used key are larger than dimensions of other shortcut keys, and adjusts a position of a specific shortcut key arranged in the shortcut key area of the user interface if the operational signal indicates that the specific shortcut key is dragged to another position in the shortcut key area; and
wherein the UI control module further sets a selected application installed in the electronic device as one shortcut key if the operational signal indicates that a "Add-Key" is touched and one of the applications installed in the electronic device is selected.

2. The device as claimed in claim 1, wherein the UI control module sets a contact item saved in an address book in the electronic device as one shortcut key if the operational signal indicates that the "Add-Key" is touched and one of the contact items saved in the address book is selected.

3. The device as claimed in claim 1, wherein the UI control module displays an extended shortcut key area if the operational signal is indicative of a horizontal slide on the touch panel.

4. The device as claimed in claim 1, wherein the UI control module displays the shortcut key area and a window of one executed application at the same time if the operational signal indicates that a window size of the executed application is adjusted to be smaller than a dimension of the touch panel.

5. The device as claimed in claim 1, wherein the UI control module is capable of displaying windows of two executed applications at the same time.

6. The device as claimed in claim 1, wherein the electronic device further comprises a sense module positioned near at least one end surface of the electronic device, the sense module transmits a switch signal to the UI control module upon detecting that a pressure applied to the end surface is larger than a threshold pressure to quickly switch the user interface to another executed application.

7. A computer-implemented method for controlling a user interface of an electronic device, the method comprising:
detecting an orientation of the electronic device;
determining an arrangement of the user interface according to the detected orientation, the user interface comprising a vertical arrangement and a horizontal arrangement;
displaying a shortcut key area and a status area on the user interface, the shortcut key area comprising a plurality of shortcut keys for activating applications of the electronic device, and the status area is configured for displaying status information of the electronic device;
adjusting the user interface according to operational signals from a touch panel of the electronic device, and dragging a specific shortcut key to another position in the shortcut key area of the user interface;
designating a specific shortcut key as a most frequently used key if the specific shortcut key is dragged to the status area, dimensions of the most frequently used key are larger than dimensions of other shortcut keys; and
setting a selected application installed in the electronic device as one shortcut key if the operational signal indicates that a "Add-Key" is touched and one of the applications installed in the electronic device is selected.

8. The method as claimed in claim 7, wherein the shortcut key area comprises at least one "Add-Key," and the adjusting step further comprising:
receiving an operational signal indicative that a contact item saved in the address book is selected; and
setting the selected contact item as one shortcut key.

9. The method as claimed in claim 7, wherein the adjusting step further comprising:
displaying an extended shortcut key area on the user interface upon receiving an operational signal indicative of a horizontal slide on the touch panel.

10. The method as claimed in claim 7, wherein the adjusting step further comprising:
adjusting a window size of the executed application so as to display the shortcut key area on the user interface at the same time.

11. The method as claimed in claim 7, wherein the adjusting step further comprising:
adjusting a window size of the executed application so as to display another window of the executed applications on the user interface at the same time.

12. The method as claimed in claim 7, wherein the electronic device further comprises a sense module positioned near at least one end surface of the electronic device, and the method further comprising:
detecting a pressure applied to the end surface installed with the sense module; and
quickly switching the user interface to another executed application upon determining that the applied pressure is larger than a threshold pressure.

13. A non-transitory computer-readable medium for controlling a user interface of an electronic device, the computer-readable medium having stored thereon instructions that, when executed by the electronic device, cause the electronic device to:

detect an orientation of the electronic device;

determine an arrangement of the user interface according to the detected orientation, the user interface comprising a vertical arrangement and a horizontal arrangement;

display a shortcut key area and a status area on the user interface, the shortcut key area comprising a plurality of shortcut keys for activating applications of the electronic device, and the status area is configured for displaying status information of the electronic device;

adjust the user interface according to operational signals from a touch panel of the electronic device, and drag a specific shortcut key to another position in the shortcut key area of the user interface;

designate a specific shortcut key as a most frequently used key if the specific shortcut key is dragged to the status area, dimensions of the most frequently used key are larger than dimensions of other shortcut keys; and set a selected application installed in the electronic device as one shortcut key if the operational signal indicates that a "Add-Key" is touched and one of the applications installed in the electronic device is selected.

14. The computer-readable medium as claimed in claim 13, wherein the shortcut key area comprises at least one "Add-Key," and the adjusting step further comprising:

receive an operational signal indicating that a contact item saved in the address book is selected; and set the selected contact item as one shortcut key.

* * * * *